F. MONROE.
HARNESS.
No. 21,267. Patented Aug. 24, 1858.
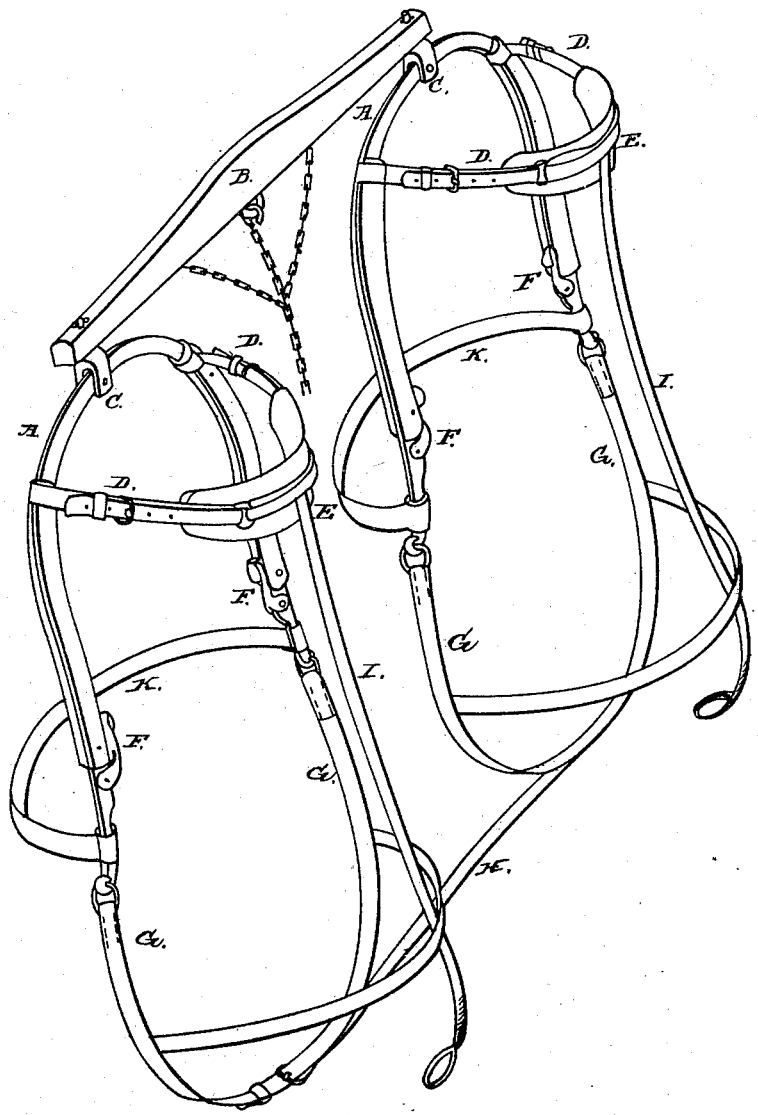
Witnesses:
C. F. Mallary
F. N. Caulkins
Inventor:
Freedom Monroe.

UNITED STATES PATENT OFFICE.

FREEDOM MONROE, OF ROMEO, MICHIGAN.

HARNESS.

Specification of Letters Patent No. 21,267, dated August 24, 1858.

*To all whom it may concern:*

Be it known that I, FREEDOM MONROE, of Romeo, in the county of Macomb and State of Michigan, have invented a new and useful Improvement in Harness for Horses; and I do hereby declare that the following is a full and exact description thereof, reference being had to the letters of reference thereon.

My improvement has reference to the two horse harness for plowing in which the coupling tree is arranged in front of the horses' breasts and the draft connection therefrom made backwardly between the horses; and it consists (in such arrangements of the coupling tree) of the novel combination therewith, of bow whiffle-trees pivoted to said coupling tree, and passing, but preferably free from contact, around the breasts and along the sides of either horse, said bows being made with rigid arms or stiff back extensions with appliances for hitching on to the ordinary or any other suitable plow harness and the whole so constructed and applied as that while the coupling bar and whiffletree are in front and, in plowing or drawing logs, "more out of the way," and the draft is established through the coupling tree in front.

The draft is that of the ordinary pulling kind, as distinct from a pushing strain, and the power of the horses is used to the greatest advantage with the draft down on the "hame collar" to prevent choking; the downward draft being governable by taking up or letting out the belly bands "to which the bows hook or hitch so as to raise or lower the back ends of the bows' side arms or extensions and vary their position relatively to the center draft chain. The whole may be supported in front by neck straps or bands, or by straps buckling in the lower rings" of the "hame bows."

To enable others skilled in the art to make and use my invention I will proceed to describe its construction and operation.

The bows propelling whiffletrees A A are attached to each end of the coupling tree B in front of the horses by a swivel joint C C. The bows are made of flat bar iron $1\frac{1}{4}$ inch wide by $\frac{1}{2}$ inch thick in the form of a horse shoe, the edge or narrow side outward with hooks F F at each end to make fast into the irons or buckles at the belly and back bands of the common plow harness now in use. On the upper and lower sides of the bow are pieces of hard wood riveted on, reaching from where the band going over the horse's neck connects with the bow to the hooks F F. The coupling tree B, is made of hard wood 4 inches wide at the center tapering to $3\frac{1}{2}$ inch at the ends and $1\frac{1}{2}$ inch thick. The draft chain L has braces to prevent one horse getting the advantage of the other.

The harness is intended to be used over the common breast collar and constructed of leather and attached as follows: On each side of the bow is a strap D D passing over the horse's neck with a pad E on top. The belly band K, the breeching G G attached to each end of the bow and the coupling strap H are to keep the horses straight behind and the crupper or back band I on top.

What I claim and desire to secure by Letters Patent, is—

The combination of the rigid bow whiffletrees (A A) with the front coupling bar or tree (B), connected by swivel joints (C C); said bows having hooks or other appliances for connecting the ends at F F with an ordinary plow harness; constructed and operating in connection with the central draft bar or chain in the manner and for the purposes specified.

FREEDOM MONROE.

Witnesses:
C. F. MALLARY,
F. N. CAULKINS.